Jan. 5, 1926.

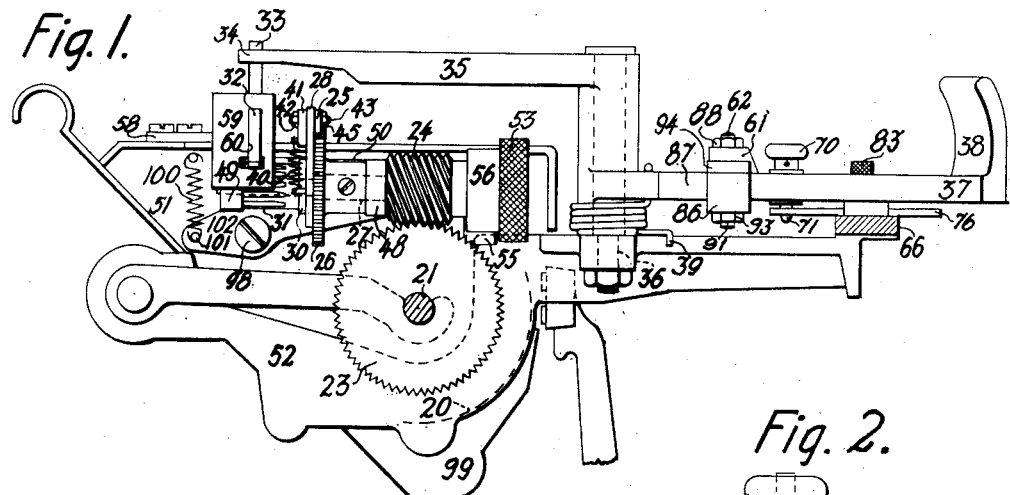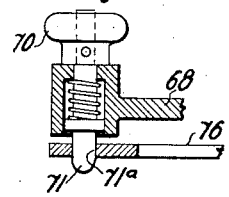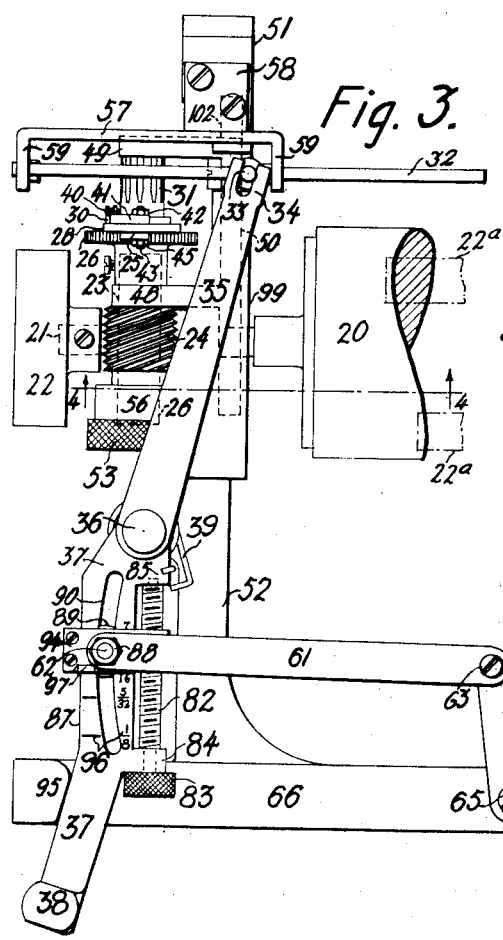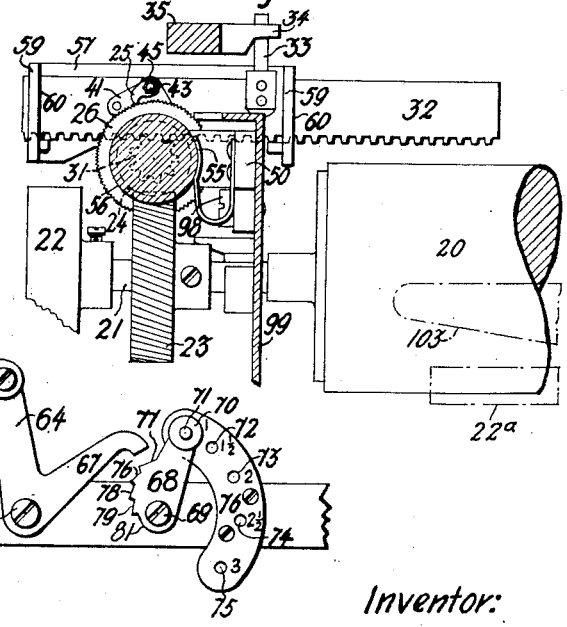

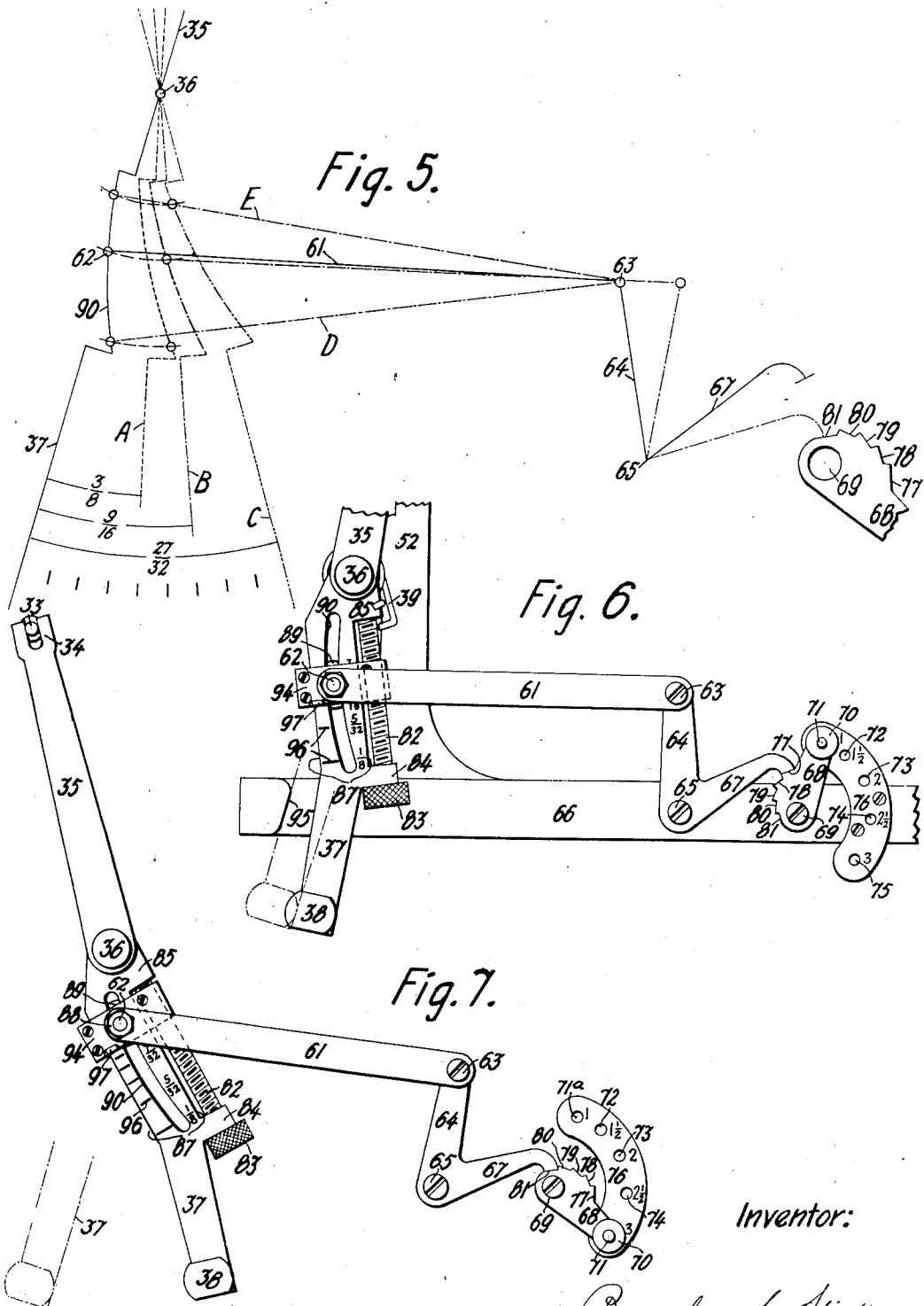

B. C. STICKNEY

TYPEWRITING MACHINE

Original Filed April 28, 1923    3 Sheets—Sheet 3

1,568,426

Inventor:
Burnham C. Stickney

Patented Jan. 5, 1926.

1,568,426

UNITED STATES PATENT OFFICE.

BURNHAM C. STICKNEY, OF RUTHERFORD, NEW JERSEY, ASSIGNOR TO UNDERWOOD TYPEWRITER COMPANY, OF NEW YORK, N. Y., A CORPORATION OF DELAWARE.

TYPEWRITING MACHINE.

Application filed April 28, 1923, Serial No. 635,237. Renewed May 22, 1925.

*To all whom it may concern:*

Be it known that I, BURNHAM C. STICKNEY, a citizen of the United States, residing in Rutherford, in the county of Bergen and State of New Jersey, formerly of Elizabeth, New Jersey, have invented certain new and useful Improvements in Typewriting Machines, of which the following is a specification.

This invention relates to line-feeding mechanism for typewriting machines. Many of the features are especially useful in connection with revoluble platens.

One of the features of the invention is the provision of a simple and practicable line-feeding mechanism which will permit not only single, double and triple line-spacing, for the usual purposes, but which will also permit additional regulation for the intermediate or fractional positions of 1½ and 2½ line-spaces, thus giving a range of five possible line-space movements, instead of the usual three.

Another feature of the invention is the provision of simple means suitable for adoption as standard for regular use, for effecting minute variations in the extent of the line-spacing movement. It is a further object of the invention to accomplish this result while permitting the platen stroke to be regular for either 1, 1½, 2, 2½ or 3 times the distance or basis that is determined by the fine regulation, but without losing such fine regulation. In other words, it is an object to enable the operator to determine by micrometer mechanism the basis for line-spacing, and then to regulate the number of spaces (multiples of said basis) through which the platen is to be spaced, with provision for the half or fractional spaces already mentioned.

An additional feature is the provision of means for effecting fine adjustments of the platen to adjust the work-sheet to exact printing position, as, for example, in typing upon ruled lines. This is done without altering the micrometer adjustment.

Another feature of the invention relates to the feeding of paper around a revoluble platen. The paper tends to feed improperly, owing to the sudden starting and sudden stopping of the platen when rotated by the usual line-space handle. An object of the invention is to overcome this difficulty, and to this end the platen is operated at uniform speed throughout the entire stroke of the line-space handle, thus avoiding the jerky movements of the ordinary pawl-and-ratchet line-spacing mechanism.

Another object of the invention is to make it feasible to dispense with the complicated mechanism which usually releasably connects the platen to the ordinary line-space wheel; and still another object is to dispense with the use of the device which usually throws off the line-space detent and applies a brake to the platen.

To gain these and other advantages, there is provided for the platen a driving rack, which is illustrated in the form of a wheel; and meshing with this wheel is a worm, rotation of which effects line-feeding of the platen; the worm being constantly in mesh with the worm-wheel during the line-feeding movements. For driving this worm by the usual carriage-returning handle, a pinion is preferably connected to the worm, and a rack which meshes with the pinion is connected to said handle, so that, as the operator returns the carriage to begin a new line, the rack drives the pinion and the pinion turns the worm and thereby revolves the platen. The worm may be provided with a fine pawl-and-ratchet or other suitable universal clutch mechanism to permit the rack to return idly to normal position, and then to drive the platen from any position thereof.

A micrometer adjustment is provided for determining the basis of the line-spacing movements, so that said basis, whose usual minimum is one-eighth of an inch, may be varied to any extent within a large range. Said basis having been determined, an additional or multi-space regulating stop mechanism is set independently, to different mechanically-located stations, to determine whether the platen shall rotate 1, 1½, 2, 2½ or 3 times the extent determined by said basis. This multi-space regulation is effected without altering or losing the adjustment that has been effected by the micrometer mechanism. Each adjustment may be effected independently of the other; one adjustment being preferably at one end of the stop train, and the other adjustment at the other end, or intermediate the line-space handle and the train.

The worm may be provided with a thumb-wheel, whereby it may be independently rotated for effecting fine adjustment of the platen upon special occasions, as, for example, when bringing a ruled work-sheet to exact typing position. It will be understood that the line-space mechanism will pick up the platen from any position thereof, making it unnecessary to attend to the disconnecting and re-connecting of the line-spacing mechanism or platen detent mechanism as heretofore. There is nothing to do but to rotate the platen to bring the sheet to typing position, and after that to simply operate the line-spacing handle for the usual purpose.

A further advantage gained is that the platen, since its line-space movement is always or nearly always an aliquant part of a revolution, does not become indented by reason of the types repeatedly striking in the same places.

Although the worm is in locking engagement with the worm-wheel, still a rapid revolution or sweeping movement of the platen by means of the usual finger-wheel thereon or otherwise, when required, is practicable. For this purpose provision is made whereby the platen may be rotated forcibly by said finger-wheel, etc., notwithstanding said worm; this provision including a spring for maintaining the worm in mesh with the worm-wheel, while yielding so as to permit it to be forced out and to ride over the worm-wheel teeth when the platen is forcibly rotated by its said finger-wheel; the worm thus performing the function of a spring lock or yieldable detent for the platen.

Other features and advantages will hereinafter appear.

In the accompanying drawings,

Figure 1 is a part-sectional side elevation of the typewriter carriage of an Underwood typewriting machine, provided with the present improvements.

Figure 2 is a sectional detail elevation of a multiple or gross line-space regulator settable step by step.

Figure 3 is a plan of the left-hand end of the typewriter carriage, showing the line-spacing mechanism in normal position, and the multiple or gross regulator as set for single spacing; the micrometer adjustment being shown in about a midway position, to secure a medium basis for line-spacing.

Figure 4 is a sectional front elevation of the mechanism seen at Figure 3, on line 4—4.

Figure 5 is a diagram of the line-spacing lever and regulating mechanism, to illustrate the range of micrometer adjustment; the gross line-spacing stop being set for triple spacing.

Figure 6 is a plan to illustrate the completion of the line-spacing of the platen through a single spacing unit whose extent is predetermined by the micrometer mechanism; the line-spacing handle being arrested by the gross regulator.

Figure 7 is a view similar to Figure 6, but showing the gross line-space regulator as adjusted for a triple space, and the stroke of the platen as having been completed. At this figure is also shown the adjustment of the micrometer or finely regulating mechanism for a maximum line-spacing basis or unit, so that this figure indicates the greatest line-spacing movement that can be transmitted to the platen.

Figure 8:
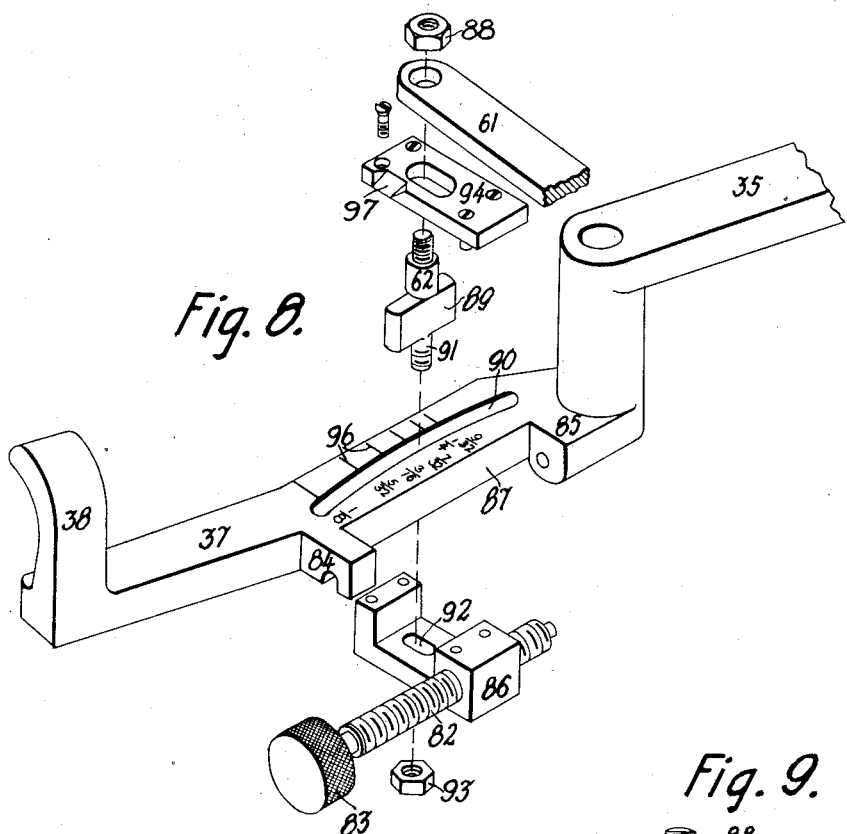

Figure 8 is a perspective view of the line-space lever and micrometer adjustment, the parts being shown separated.

Figure 9:
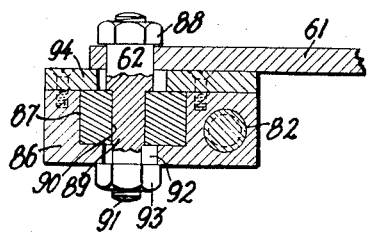

Figure 9 is an enlarged fragmentary sectional elevation of the micrometer mechanism.

Figure 10:
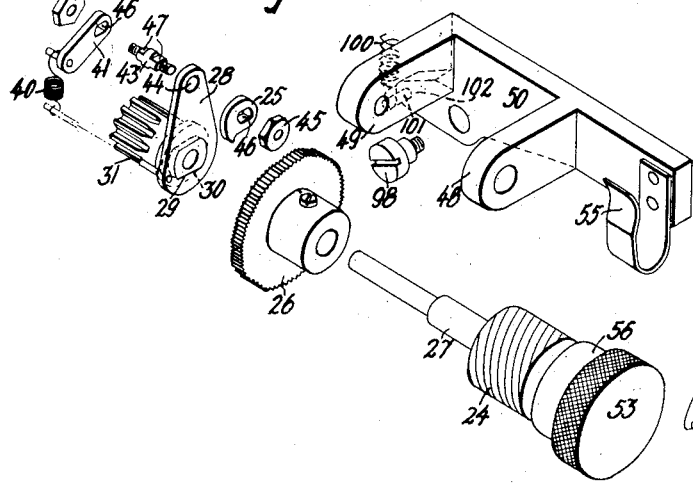

Figure 10 is a perspective view of the details of the worm-shaft and appurtenant mechanism, the parts being shown separated.

The usual Underwood revoluble platen 20 is shown mounted upon an axle 21, provided, usually at each end, with a finger-wheel 22, for sweeping the platen around through one or more revolutions or long arcs; feed-rolls 22ᵃ usually running upon the platen. The line-spacing of the platen is effected by means of a worm-wheel 23, with which meshes a worm 24, which may be multiple-threaded, so as to secure the desired extent of rotation of the platen without the necessity of unduly extended rotation of the worm. This worm may be revolved always in one direction by means of a reciprocating pawl 25, meshing with a fine-toothed ratchet-wheel 26, the latter fixed upon shaft 27 of worm 24. Said pawl may be mounted upon an arm 28, which is revoluble about the axis of the ratchet-wheel 26, and is keyed at 29 to the hub 30 of a pinion 31, which is co-axial with the worm 24. This pinion may be driven by a rack 32, the latter having a stud or post 33 confined in a fork 34 which is provided upon the rear arm 35 of an operating lever of the first order. This lever is pivoted at 36 upon the usual pivot or fulcrum at the left-hand end of the Underwood typewriting machine, and comprises an arm 37 which extends forwardly from said pivot and is provided at its front end with a finger-piece or handle 38. This is swung towards the right at Figure 3 in order to effect line-spacing of the platen.

It will be understood that movement of the line-space handle 38 to the right at Figure 3 will revolve the lever about the pivot 36, and by means of the lug 33 drive the rack 32 to the left, thereby rotating the pinion 31 and the arm 28 thereon, to carry around the pawl 25, which drives the ratchet-wheel 26, together with the worm 24 fixed thereto, to effect a line-spacing movement of the worm-wheel 23 and platen 20. The movement of the platen is at uniform speed, and it is positively arrested by the worm 24, which remains in mesh with the wheel 23.

Upon the relief of the handle 38 from pressure, a spring 39 returns it to normal position, together with the rack 32, pinion 31 and arm 28 with its pawl 25, the latter riding idly back over the ratchet-teeth. A spring 40 holds the pawl 25 in mesh with the teeth. This spring is connected to an arm 41, which is held by means of a nut 42 upon a pivot 43, the latter being loose in a pivot hole 44 in the end of arm 28. Upon the front side of said arm is secured said pivot by a nut 45. Both pawl 25 and arm 41 are prevented from rotating relatively to the pivot 43 by having square holes 46 to fit upon squared shoulders 47 formed on said pivot pin 43, Figure 10. The worm-shaft 27 is journaled in arms 48, 49 extending to the left from a frame 50, which is supported upon the end 51 of the platen-frame. This platen-frame is usually supported upon the typewriter carriage 52, the platen being shiftable up and down together with the platen-frame. The line-spacing train, beginning with 33, also shifts up and down, these shifting movements being accommodated by the length of the lug 33, which shifts up and down idly in the slot or fork 34 of the line-spacing lever.

For initially adjusting the work-sheet, rotation of the worm 24 (in one direction) may be effected at will by means of a thumb-wheel 53 fixed upon the end of the worm 24; and a spring, brake or friction device 55 may be secured upon the frame 50, to press against the hub 56 of the thumb-wheel 53, to prevent accidental rotation of the worm-wheel when the platen is rotated rapidly by means of its finger-wheel 22.

The rack 32 may be guided in a bracket 57 having a base 58, whereby it is secured upon the platen-frame end 51, said bracket comprising end ears 59, perforated to form guideways 60 for the rack. The stud 33 rises from the top of the rack, and the arm 35 stands at sufficient elevation to clear the rack when the platen-frame is shifted up for typing capital letters.

Gross line-space regulating means, whereby the platen-driving stroke of the handle 37 may be variably limited, may comprise a link 61, having a pivotal connection at 62 to the line-space handle 37, and extending to the right and pivoted at its end at 63 to an arm 64 of a bell-crank, which is pivoted at 65 upon the front bar 66 of the typewriter carriage; said bell-crank also comprising a stop arm 67, to co-operate with a stepped regulating stop 68. Said stop 68 may be pivoted at 69 to the bar 66 of the typewriter carriage, and is preferably adjustable to five positions. The first position is seen at Figure 3, for single spacing, that is, for arresting the line-space mechanism when the platen has rotated the distance of a single line-space. This stop 68 may have a handle 70 provided with a pin 71, which may be set into any of a series of holes 71ª, 72, 73, 74 and 75, all provided in a plate 76 that may also be secured upon the top of the front bar 66 of the carriage. At Figure 7, the stop 68 is shown with its pin 71 in hole 75, to secure triple movement or spacing of the platen. The stop 68 may have stop shoulders 77, 78, 79, 80 and 81, corresponding respectively to the holes 71ª, 72, 73, 74 and 75. The hole 73 and the stop shoulder 79 are for double spacing. The intervening holes 72 and 74 are for intermediate or fractional spacing, that is, for effecting a 1½ space movement and a 2½ space movement of the platen, respectively; these holes corresponding to stop shoulders 78 and 80.

Thus it will be seen that by simple and practicable mechanism provision may be made for multiple-spacing and fractional-spacing, with great variation in the number of positions to which the line-space regulator may be set, and also that this may be done without disturbing the micrometer mechanism (which will now be described), and in fact may be done whether or not any micrometer mechanism is used, inasmuch as in any case there are no set positions of the platen as is common with platens having the usual line-space wheels and detents therefor.

When it is desired to vary the basis of line-spacing, that is, to have the platen revolved a trifle more or a trifle less, at each operation of the line-space handle 38, there may be adjusted a micrometer mechanism which may in one form of the invention comprise a screw 82, having a knurled head 83 for manipulation, and pivoted in ears 84, 85 formed upon the line-space lever arm 37. This screw 82 is endwise motionless, but is threaded through a movable block 86 that carries said link pivot 62; and hence said link pivot may be adjusted to various points, for instance to a point near the lever fulcrum 36, as at Figure 7, securing in this position a maximum stroke of the line-space lever, and hence a maximum line-space feeding movement of the platen, that is, a maximum line-spacing basis or unit. At Figure 7, the gross regulating mechanism is shown as set for triple space, but it will be understood that it may be set for single space or double space, or for any fractional or mixed-number space, without disturbing the adjustment of the pivot 62, so that there will be secured a maximum single space or a maximum double space or a maximum triple space, or maximum mixed-number spaces, according to the setting of the gross regulator. By turning the screw 82 in the opposite direction, the pivot 62 may be adjusted to either a midway position, as at Figures 3 and 6, or to an extreme forward position, the latter securing a minimum line-space basis, and hence a minimum throw of the platen for either single, single and a half, double, double and a half or triple line-spacing movements. After the pivot 62 is once thus finely adjusted, the gross regulator 68 can be adjusted to any desired station without disturbing the adjustment of pivot 62. The machine is therefore well adapted for standard or ordinary work and permits the operator to fix upon any desired line-space basis, without resorting to the expedient heretofore used of providing the line-space ratchet-wheel for each individual machine with such number of teeth as may be required.

At Figure 5 is shown diagrammatically in full lines the position of the line-space lever corresponding to Figure 3, the multiple stop or gross regulator being set for triple-spacing. By the full lines 35, 90, 37, 61, 64, 67 the parts are indicated in normal positions. The micrometer mechanism is shown in full lines adjusted nearly to a midway point. The line-space handle 37 will swing from said normal position to position marked B, giving the platen a rotation of about $\tfrac{9}{16}$ of an inch; this being equal to three line-space units, each of which has an extent of about $\tfrac{3}{16}$ of an inch. If the link 61 is adjusted downwardly by the micrometer mechanism to the position marked D, then the handle 37 will be arrested at the position marked A, thus giving the platen a triple space, the basis of which is about $\tfrac{1}{8}$ of an inch. If the link 61 is adjusted by the micrometer mechanism to the position marked E, then the stroke of the handle 37 will terminate at the position marked C, thus giving the platen a line-spacing movement of about $\tfrac{3}{32}$ of an inch, that is, three spaces whose basis is $\tfrac{9}{32}$ of an inch. If double-spacing instead of triple-spacing is desired for these or any other bases, it is only necessary to turn the stop 68 to bring the step 79 thereon into use; and so on.

The pivot block 86 has a sliding fit upon a parallel-sided portion 87 of the line-space lever 37, and hence can be slidden forwardly and backwardly along said lever away from and towards the pivot 36.

The pivot 62, to which the left-hand end of link 61 is directly pivoted (being retained by a nut 88), is provided with a follower portion 89, that works in a slot 90 extending longitudinally of the portion 87 of the line-space lever; and below said follower 89 extends a stem 91, to pass down through a transverse slot 92 in block 86; said stem 91 having a retaining nut 93. As the block is slidden backwardly and forwardly along the arm, the member 89 follows the curve of the slot 90, its motion being accommodated by the cross slot 92. The block 86 may be held on the arm by a cap plate 94. The slot 90 is preferably curved concentrically with the link pivot 63 at Figure 3. By this and other disclosed provisions, the proportioning of the single, double and triple line-space movements is rendered substantially correct for all positions to which pivot 62 may be adjusted by the use of the screw 82. Whatever the position of the pivot 62, or whatever is the effective length of the arm 37, the use of the stop shoulder 79 will give with sufficient accuracy twice the platen-feeding movement as the stop 77, and the stop shoulder 81 three times. The handle 37 is pressed by spring 39 against a fixed stop 95, and the length of stroke for any line-space basis or unit depends upon the setting of the stepped stop device 68, to mechanically-located stations. At Figure 7 is illustrated the method of securing the greatest possible line-space movement of the platen, since the line-space basis is the maximum, and the stop is set for triple space; the movement of the line-space handle between the dotted line normal stop position and the full-line extreme stop position being the maximum. A minimum basis may be secured by adjusting the pivot 62 to a position most remote from the pivot 36, as shown at dotted lines at D, Figure 5.

The arm 87 of the line-space lever may be provided with indicating graduations 96, and the block may carry a co-operating index 97 to aid the operator in securing any desired line-space basis. The regulating plate 76 may be provided with appropriate figures opposite the various line-spacing stations.

The frame 50 is pivoted upon a shouldered screw 98, which is threaded into or suitably supported upon the side 99 of the platen-frame end 51, as seen at Figure 4. This pivoting of the frame permits the worm 24 to be forced up or out when the platen is rotated forcibly by means of a finger-wheel 22 or otherwise. A spring 100 is connected to a pin 101 on a rearwardly extending arm 102 which is provided upon said frame 50, whereby the worm 24 is maintained in firm engagement with the ratchet-wheel. The latter has beveled or pointed teeth, and the threads of the worm are of corresponding shape, to facilitate the camming or forcing of the worm out of the teeth of the worm-wheel when the finger-wheel 22 is forced around. The platen may be line-spaced as far as desired by means of the handle 37 and the worm-wheel, and then the work-sheet may be finally adjusted a slight distance to the usual front wing-scales 103, Figure 4, by using either the finger-wheel 53 or the line-spacing handle 37, as preferred. After the work-sheet has thus been once adjusted to printing position by the aid of the wing-scale 103, the feeding of the platen line by line may be effected mechanically by the line-spacing handle 37. Releasing mechanism between the wheel 23 and the platen is thus rendered unimportant or unnecessary; nor is there need for the use of the ordinary device to release the platen-ratchet-wheel from control of its usual detent and concomitantly throw into use a brake to prevent rotation of the platen.

Thus it will be seen that the mechanism is simple, inexpensive and practicable for ordinary use even where the line-space basis is never intended to be changed, and that it also affords a permanent micrometer setting of the line-spacing basis, as well as a re-adjustment of the basis from time to time for special work. Thus the machine is adapted for both ordinary line-spacing and also for micrometer variations in the measurement of a single line-space. When it is desired to adapt the platen movements for use with ruled lines, it is only necessary to adjust the gross line-spacing device 68 to such a point that approximate line-spacing of the platen is secured, and then to adjust the screw 82, 83 until the desired exactitude of line-spacing is reached. This obtains the desired result by a simple and quick operation.

Since the motion of the platen corresponds with and is controlled throughout by the motion of the line-space lever, the snappy, jerky action of the platen which is unavoidable where ordinary line-space ratchet-wheel and pawl are employed, is avoided, and the platen moves at reduced speed, and its speed is uniform, so that faulty line-spacing arising from inertia of the paper or lack of co-operation between the platen, the paper and the feed-rolls, is minimized or eliminated.

Furthermore, the line-spacing lever swings between two stop positions:—a normally fixed back stop on the frame and an adjustable forward stop also on the frame that is settable to different mechanically-located stations that determine the number of line-space units which the platen is to be moved.

Variations may be resorted to within the scope of the invention, and portions of the improvements may be used without others.

Having thus described my invention, I claim:

1. In a typewriting machine, the combination with a platen, of line-spacing mechanism including means for effecting micrometer variations of the extent of a single line-space, and means settable to different predetermined stations for determining the number of line-spaces which the platen is to be moved at each line-spacing operation.

2. In a typewriting machine, the combination with a platen, of line-spacing mechanism including means for effecting micrometer variations of the extent of a single line-space, and means settable to different mechanically-located stations for determining the number of line-spaces which the platen is to be moved at each line-spacing operation, said determining means including means settable for line-spacing the platen either 1, 1½, 2, 2½ or 3 line-spaces at will.

3. In a typewriting machine, the combination with a platen, of line-spacing mechanism including means for effecting micrometer variations of the extent of a single line-space, and means settable to different mechanically-located stations for determining the number of line-spaces which the platen is to be moved at each line-spacing operation, said line-spacing mechanism including an adjustment whereby the platen may be finely adjusted at will to bring a work-sheet to exact printing position; the line-spacing mechanism being fully effective upon the platen from any rotative position to which the latter may be finely adjusted.

4. The combination with a line-space handle and a revoluble platen, of a line-spacing mechanism including a worm and worm-wheel device driven by the handle and connected to the platen to operate the same at uniform speed throughout the entire stroke of the handle.

5. The combination with a line-space handle and a revoluble platen, of a line-spacing mechanism including a worm and worm-wheel device driven by the handle and connected to the platen to operate the same, and means for regulating the number of line spaces to which the platen is to be moved at each line-spacing operation.

6. The combination with a platen, of a platen-driving rack, a worm to mesh therewith, and a line-space handle connected to the worm to drive the same.

7. The combination with a platen, of a platen-driving rack, a worm to mesh therewith, and a line-space handle connected to the worm to drive the same, the connecting means including a pinion which is connected to the worm, and a rack which is connected to the handle and meshes with the pinion.

8. The combination with a platen, of a platen-driving rack, a worm to mesh therewith, a line-space handle connected to the worm to drive the same, and a pawl-and-ratchet mechanism for said worm to permit the handle to return idly to normal position.

9. The combination of a platen, a worm, a worm-wheel meshing with the worm and connected to the platen, a reciprocating line-space handle, means to enable said handle to drive said worm to line-space the platen, and means for effecting micrometer adjustments of the line-spacing movement of said handle, to effect fine variations of the extent of the line-spacing unit of movement of the platen.

10. The combination of a platen, a worm, a worm-wheel meshing with the worm and connected to the platen, a reciprocating line-space handle, means to enable said handle to drive said worm to line-space the platen, means for effecting micrometer adjustments of the line-spacing movement of said handle, to effect fine variations of the extent of the line-spacing unit of movement of the platen, and independent means for multiplying said movement without disturbing the micrometer adjustment.

11. The combination of a platen, a worm, a worm-wheel meshing with the worm and connected to the platen, a reciprocating line-space handle, means to enable said handle to drive said worm to line-space the platen, means for effecting micrometer adjustments of the line-spacing movement of said handle, to effect fine variations of the extent of the line-spacing unit of movement of the platen, and independent means for multiplying said movement by either 1 or 2 or a mixed number.

12. The combination with a platen having a rack, of a worm to mesh with said rack, a line-space handle, means to enable said line-space handle to drive said worm to line-space the platen, and a micrometer stop mechanism for arresting said handle.

13. The combination with a platen having a rack, of a worm to mesh with said rack, a line-space handle, means to enable said line-space handle to drive said worm to line-space the platen, a micrometer stop mechanism for arresting said handle, to determine the extent of the line-spacing basis; and a line-space regulating mechanism independently settable to multiply the line-spacing movement twice or thrice at will.

14. The combination with a platen and a rack therefor, of a worm to mesh with said rack, a line-space handle, means to enable said handle to drive said worm, and a stop mechanism for said handle having at one end a micrometer adjustment for effecting fine variations in the basis of the line-spacing movement, and having at the other end a line-space multiplying settable stop.

15. The combination with a platen and a rack therefor, of a worm to mesh with said rack, a line-space handle, means to enable said handle to drive said worm, a stop mechanism having a finely variable connection to said line-space handle, to effect micrometer adjustments in the proportion of the stop mechanism movement to the handle movement, and a regulating mechanism for multiplying the line-space movement of the platen when arresting the handle.

16. The combination with a platen and a rack therefor, of a worm to mesh with said rack, a line-space handle, means to enable said handle to drive said worm, a stop mechanism having a finely variable connection to said line-space handle, to effect micrometer adjustments in the proportion of the stop mechanism movement to the handle movement, and a regulating mechanism for multiplying the line-space movement of the platen by either whole or mixed numbers when arresting the handle.

17. The combination of a platen, a worm, a worm-wheel meshing with the worm and connected to the platen, a reciprocating line-space handle, means to enable said handle to drive said worm to line-space the platen, means for effecting micrometer adjustments of the line-spacing movement of said handle, to effect fine variations of the extent of the line-spacing unit of movement of the platen, and independent means for multiplying said movement without disturbing the micrometer adjustment, said worm provided with a thumb-wheel whereby it may be independently rotated for effecting fine adjustment of the platen at will, without disturbing the setting of the micrometer mechanism or the independent line-space multiplying means.

18. The combination with a revoluble platen, of a worm, a worm-wheel connected to said platen and meshing with said worm, a line-space handle to operate said worm, said worm mounted to ride over the teeth of the worm-wheel when the platen is forcibly rotated, and a spring to press the worm into mesh with the worm-wheel, whereby the worm performs the function of a yieldable detent or lock.

19. The combination with a revoluble platen, of a worm, a worm-wheel connected to said platen and meshing with said worm, a line-space handle to operate said worm, said worm mounted to ride over the teeth of the worm-wheel when the platen is forcibly rotated, a spring to press the worm into mesh with the worm-wheel, whereby the worm performs the function of a yieldable detent or lock, and a friction device to oppose rotation of the worm.

20. The combination with a revoluble platen having an axle, of a worm-wheel upon the platen-axle, a worm meshing therewith, said worm having multiple threads, a pawl-and-ratchet mechanism for rotating the worm, including a driving arm or part connected to the pawl and rotatable concentrically with the ratchet-wheel, a pinion to drive said arm, a driving rack meshing with said pinion, and a line-space handle connected to said driving rack.

21. The combination with a revoluble platen having an axle, of a worm-wheel upon the platen-axle, a worm meshing therewith, said worm having multiple threads, a pawl-and-ratchet mechanism for rotating the worm, including a driving arm or part connected to the pawl and rotatable concentrically with the ratchet-wheel, a pinion to drive said arm, a driving rack meshing with said pinion, and a line-space handle connected to said driving rack, said platen mounted upon a platen-frame shiftable for writing capital letters, and a carriage upon which the platen-frame is shiftable, said handle mounted upon the carriage, said rack having a lug, and the handle having a fork to engage said lug to drive the rack while permitting the up-and-down shifting of the platen-frame.

22. The combination with a revoluble platen having an axle, of a worm-wheel upon the platen-axle, a worm meshing therewith, said worm having multiple threads, a pawl-and-ratchet mechanism for rotating the worm, including a driving arm or part connected to the pawl and rotatable concentrically with the ratchet-wheel, a pinion to drive said arm, a driving rack meshing with said pinion, and a line-space handle connected to said driving rack, said platen mounted upon a platen-frame shiftable for writing capital letters, and a carriage upon which the platen-frame is shiftable, said handle mounted upon the carriage, said rack having a lug, and the handle having a fork to engage said lug to drive the rack while permitting the up-and-down shifting of the platen-frame, said handle comprising an arm extending forwardly from its pivot and an arm extending rearwardly from its pivot and having said fork.

23. The combination with a revoluble platen having an axle, of a worm-wheel upon the platen-axle, a worm meshing therewith, a pawl-and-ratchet mechanism for rotating the worm, including a driving arm or part connected to the pawl, a pinion to drive said arm, a driving rack meshing with said pinion, a line-space handle connected to said driving rack, and a spring to return the handle to normal position together with the rack, pinion and driving arm.

24. The combination with a revoluble platen having an axle, of a worm-wheel upon the platen-axle, a worm meshing therewith, a pawl-and-ratchet mechanism for rotating the worm, including a driving arm or part connected to the pawl, a pinion to drive said arm, a driving rack meshing with said pinion, a line-space handle connected to said driving rack, a spring to return the handle to normal position together with the rack, pinion and driving arm, and a thumb-wheel upon said worm to drive the same.

25. The combination with a revoluble platen having an axle, of a worm-wheel upon the platen-axle, a worm meshing therewith, a pawl-and-ratchet mechanism for rotating the worm, including a driving arm or part connected to the pawl, a pinion to drive said arm, a driving rack meshing with said pinion, a line-space handle connected to said driving rack, a spring to return the handle to normal position together with the rack, pinion and driving arm, and a friction device for opposing the movement of the worm.

26. The combination with a revoluble platen having an axle, of a worm-wheel upon the platen-axle, a worm meshing therewith, a pawl-and-ratchet mechanism for rotating the worm, including a driving arm or part connected to the pawl, a pinion to drive said arm, a driving rack meshing with said pinion, a line-space handle connected to said driving rack, and regulatable means for multiplying the extent of the line-space movement produced by said handle and worm.

27. The combination with a revoluble platen having an axle, of worm-wheel upon the platen-axle, a worm meshing therewith, a pawl-and-ratchet mechanism for rotating the worm, including a driving arm or part connected to the pawl, a pinion to drive said arm, a driving rack meshing with said pinion, a line-space handle connected to said driving rack, and regulatable means for multiplying the extent of the line-space movement produced by said handle and worm by either whole or mixed numbers.

28. The combination with a revoluble platen having an axle, of a worm-wheel upon the platen-axle, a worm meshing therewith, a pawl-and-ratchet mechanism for rotating the worm, including a driving arm or part connected to the pawl, a pinion to drive said arm, a driving rack meshing with said pinion, a line-space handle connected to said driving rack, regulatable means for multiplying the extent of the line-space movement produced by said handle and worm, comprising a link having a pivotal connection to the line-space handle and a stop-member to which the link is connected, said stop-member pivoted on the typewriter-carriage, and a settable stepped stop in the path of said stop-member.

29. The combination with a revoluble platen having an axle, of a worm-wheel upon the platen-axle, a worm meshing therewith, a pawl-and-ratchet mechanism for rotating the worm, including a driving arm or part connected to the pawl, a pinion to drive said arm, a driving rack meshing with said pinion, a line-space handle connected to said driving rack, regulatable means for multiplying the extent of the line-space movement produced by said handle and worm, comprising a link having a pivotal connection to the line-space handle and a stop-member to which the link is connected, said stop-member pivoted on the typewriter-carriage, and a settable stepped stop in the path of said stop-member, said settable stop being mounted upon the typewriter-carriage and adjustable to afford single, double or triple line-spacing of the platen and also to afford line-spacing movements of mechanically determined intermediate extent.

30. The combination with a revoluble platen having an axle, of a worm-wheel upon the platen-axle, a worm meshing therewith, a pawl-and-ratchet mechanism for rotating the worm, including a driving arm or part connected to the pawl, a pinion to drive said arm, a driving rack meshing with said pinion, a line-space handle connected to said driving rack, regulatable means for multiplying the extent of the line-spaced movement produced by said handle and worm, comprising a link having a pivotal connection to the line-space handle and a stop-member to which the link is connected, said stop-member pivoted on the typewriter-carriage, a settable stepped stop in the path of said stop-member, said settable stop having a handle and provided with a movable pin, and a carriage having a series of holes to receive the pin.

31. The combination with a platen, of a platen-driving rack, a worm to mesh therewith, a line-space handle connected to the worm to drive the same, a multiplying or gross line-space regulator, and a micrometer mechanism for independently varying the extent of the line-space movement of the platen independently of adjustable or gross regulator.

32. The combination with a platen, of a platen-driving rack, a worm to mesh therewith, a line-space handle connected to the worm to drive the same, a multiplying or gross line-space regulator, and a micrometer mechanism for independently varying the extent of the line-space movement of the platen independently of said adjustable or gross regulator, said micrometer mechanism comprising a screw threaded into the line-space handle longitudinally thereof, a block threaded upon said screw, and a link pivotally connected to said block, whereby the pivot of the link may be adjusted towards and from the fulcrum of the handle, said link co-operative with said gross regulator.

33. The combination with a platen, of a platen-driving rack, a worm to mesh therewith, a line-space handle connected to the worm to drive the same, a multiplying or gross line-space regulator, a micrometer mechanism for independently varying the extent of the line-space movement of the platen independently of said adjustable or gross regulator, including a link pivoted to said handle, and means for effecting fine variations in the distance of the link-pivot from the fulcrum of the line-space handle, said link co-operative with said gross regulator.

34. The combination with a platen, of a platen-driving rack, a worm to mesh therewith, a line-space handle connected to the worm to drive the same, a multiplying or gross line-space regulator, and a micrometer mechanism for independently varying the extent of the line-space movement of the platen independently of said adjustable or gross regulator, said micrometer mechanism comprising a screw threaded into the line-space handle longitudinally thereof, a block threaded upon said screw, and a link pivotally connected to said block, whereby the pivot of the link may be adjusted towards and from the fulcrum of the handle, said link co-operative with said gross regulator, said line-space handle having a parallel-sided portion, and said block having a sliding fit upon said portion to be slidden along said handle by means of said screw.

35. The combination with a platen, of a platen-driving rack, a worm to mesh therewith, a line-space handle connected to the worm to drive the same, a multiplying or gross line-space regulator, and a micrometer mechanism for independently varying the extent of the line-space movement of the platen independently of said adjustable or gross regulator, said micrometer mechanism comprising a screw threaded into the line-space handle longitudinally thereof, and a block threaded upon said screw, a link pivotally connected to said block, whereby the pivot of the link may be adjusted towards and from the fulcrum of the handle, said link co-operative with said gross regulator, said line-space handle having a parallel-sided portion, and said block having a sliding fit upon said portion to be slidden along said handle by means of said screw, and a fixed stop for said handle.

36. The combination of a platen, a worm, a worm-wheel meshing with the worm and connected to the platen, a reciprocating line-space handle, means to enable said handle to drive said worm to line-space the platen, a frame upon which said worm-wheel is mounted, a spring to press the worm into mesh with the worm-wheel and to permit the worm to be forced out by the platen when rotated forcibly by its usual hand-wheel, the teeth of the worm-wheel being sufficiently pointed, and the threads of the worm-wheel having corresponding shape, to facilitate the camming or forcing of the worm out of mesh with the worm-wheel teeth, and a finger-wheel upon the platen to rotate the same.

37. In a typewriting machine, the combination of a platen, a line-space handle, a platen-driving worm driven by the handle, and means for regulating the number of line-spaces to which the platen is to be moved at each line-spacing operation.

38. In a typewriting machine, the combination of a platen, a line-space handle, a platen-driving worm driven by the handle, and means for regulating the number of line-spaces to which the platen is to be moved at each line-spacing operation; said regulating means including means for line-spacing the platen either 1, 1½, 2, 2½ or 3 line-spaces at will.

39. The combination with a platen, of a reciprocating line-space handle connected to drive the platen from any point in its revolution through different aliquant parts of a revolution, means being provided for detaining the platen at any point in its revolution, and line-space-multiplying stop mechanism, settable to different mechanically-located stations.

40. The combination with a platen, of a reciprocating line-space handle connected to drive the platen from any point in its revolution through different aliquant parts of a revolution, means being provided for detaining the platen at any point in its revolution, and line-space-multiplying stop mechanism settable to different mechanically-located stations and including means for multiplying the normal line-space interval or basis by both whole and mixed numbers.

41. In a typewriting machine, the combination with a platen, of a line-spacing mechanism having a reciprocating handle and including means for effecting micrometer variations of the extent of a single line-space, and means settable to different mechanically-located stations for determining the number of line-spaces which the platen is to be moved at each line-spacing operation; stops being included for limiting both the driving and return strokes of said handle.

42. In a typewriting machine, the combination with a platen, of line-spacing mechanism therefor including a micrometer device for effecting fine variations in the measurement of a single line-space, and stop means shiftable between predetermined stations for determining whether one or a plurality of the measured line-spaces shall be traversed by the platen at each line-spacing operation, said shiftable means universal for the entire range of adjustment of said micrometer device.

43. A typewriting machine including a revoluble platen, a line-space lever, micrometrical adjusting means mounted upon the line-space lever to predetermine a single line-space unit of rotation for the platen, and means for multiplying the line-space unit for a full line-space rotation of the platen.

44. In a typewriting machine including a revoluble platen, a line-space lever, means mounted upon the lever to micrometrically adjust the translation of motion therefrom to vary the single line-space unit of rotation for the platen, and means for multiplying the line-space unit for a full line-space rotation of the platen.

BURNHAM C. STICKNEY.